United States Patent
Maratta

(10) Patent No.: US 7,458,592 B2
(45) Date of Patent: Dec. 2, 2008

(54) BODY BOARD SLIDING DEVICE FOR SLIDING ON GROUND

(76) Inventor: Mark S. Maratta, 919 Mokapu Blvd., Kailua, Oahu, HI (US) 96734

( * ) Notice: Subject to any disclaimer, the term of this patent is extended or adjusted under 35 U.S.C. 154(b) by 254 days.

(21) Appl. No.: 11/347,523

(22) Filed: Feb. 3, 2006

(65) Prior Publication Data
US 2007/0182117 A1    Aug. 9, 2007

(51) Int. Cl.
    *B62K 1/00*    (2006.01)
(52) U.S. Cl. .................. 280/87.041; 280/844; 305/120
(58) Field of Classification Search .............. 280/18, 280/19, 21.1, 28.17, 600, 844, 13, 14.21, 280/87.01, 87.04, 87.041, 32, 32.6; 180/180; 305/120, 121, 122, 157–184
See application file for complete search history.

(56) References Cited

U.S. PATENT DOCUMENTS

| | | | |
|---|---|---|---|
| 3,589,463 A * | 6/1971 | Stowers | 180/9.25 |
| 4,145,064 A * | 3/1979 | Carn | 280/87.01 |
| 4,440,408 A | 4/1984 | Velman | |
| 4,572,528 A | 2/1986 | McBride | |
| 4,600,073 A * | 7/1986 | Honett | 180/181 |
| 4,627,630 A * | 12/1986 | Hutter | 280/28.5 |
| 4,984,648 A * | 1/1991 | Strzok | 180/181 |
| 5,305,846 A * | 4/1994 | Martin | 180/181 |
| 5,580,096 A * | 12/1996 | Freilich | 280/844 |
| 5,730,241 A * | 3/1998 | Shyr et al. | 180/181 |
| 6,007,074 A | 12/1999 | Tarng | |
| 6,209,894 B1 | 4/2001 | Walker | |
| 6,367,827 B1 | 4/2002 | Schneider | |
| 6,431,560 B2 | 8/2002 | Cummings | |
| 6,435,290 B1 * | 8/2002 | Justus et al. | 180/9.1 |
| 6,561,118 B2 * | 5/2003 | Mead | 114/357 |
| 6,729,651 B2 * | 5/2004 | Pace | 280/845 |

* cited by examiner

*Primary Examiner*—Lesley D Morris
*Assistant Examiner*—Brian Swenson
(74) *Attorney, Agent, or Firm*—Leighton K. Chong

(57) ABSTRACT

A sliding device for sliding on the ground down a sloped or inclined surface (grass, dirt, sand, synthetic turf, etc.) has an upper deck and a slide mechanism mounted below and in parallel with the upper deck. The slide mechanism has a slide base of an elongated planar member with opposite radiused ends, and an endless anti-friction belt entrained to slide around the slide base. The belt can be made of high-density plastic, rubber, or a track belt. The slide base surfaces and inner surfaces of the belt may be coated with plastic laminating material to increase slipperiness. The slide base has ends of selected radius of curvature to generate friction forces with the moving belt that provide a "speed limiting" function that slows the device from excessive speeds. In a preferred embodiment, the sliding device is shaped as a body board made of foam material having the slide mechanism recessed in a cavity formed within the bottom of the body to keep the rider's hands or feet from contacting the moving belt. The device may also be configured in various other products for sliding like a sled, a ski, or a skateboard.

20 Claims, 9 Drawing Sheets

SLIDE MECHANISM ASSEMBLED VIEW

SLIDE MECHANISM ASSEMBLED VIEW

SLIDE MECHANISM FRONT VIEW

BODY BOARD SLIDING DEVICE FOR SLIDING ON GROUND

TECHNICAL FIELD

This invention generally relates to a body board or similar device for sliding on the ground (grass, dirt or synthetic turf) down a hill or other inclined surface, and especially one which is safe to use and can provide hours of fun, while also being inexpensive to fabricate, having few moving parts, and being simple to assemble, use, and maintain.

BACKGROUND OF INVENTION

Practically everyone at one time or another has used a sled to slide down a hill on snow and remembers what fun it was. However, during the summer when hills are covered by grass or dirt or in climates that do not have snow, there is no "summer sled" or "grass sled" that can provide similar fun. Some prior devices have attempted to provide a board or ski with ground friction-reducing mechanisms for this purpose. As examples, U.S. Pat. No. 6,367,827 shows a slider board with side rails mounting a crawler track over a series of rollers in a line from front to back. U.S. Pat. No. 6,007,074 shows a boot-mounting skateboard fitted with an endless belt tracked around a pair of spaced apart rollers. U.S. Pat. No. 4,572,528 shows a grass ski with boot mounting and a slider belt entrained over a spring-loaded system below. U.S. Pat. No. 4,440,408 shows an elevated seat mounted on a ski board sliding on an endless belt supported on rollers. U.S. Pat. No. 6,209,894 shows a ground sled supported on parallel front-to-back wheel racks. U.S. Pat. No. 6,431,560 shows a sliding board which has clamps for holding blocks of ice on its lower surface to eliminate friction when used on the ground. Other devices have been proposed that provide variations of a tracking sled, ski, or skateboard powered with an endless belt driven by a motor.

However, these types of prior board or sled devices have required complicated and expensive bearings, mounting, and/or tracking systems which make them very costly to manufacture and difficult to maintain in fault-free, usable condition. The various types of "grass skis" or "grass skateboards" also have complicated systems of wheels, rollers, or belts. In addition, the presence of a wheeled, rollered, or tracked system beneath a slider board, ski, or skateboard elevates its height above the ground and risks possible injury to the user from tipping or flipping over. Standing up, sitting on a seat, or sitting or lying on an elevated board also does not give the user as keen a sense of being in contact with and sliding or "surfing" on the ground.

SUMMARY OF INVENTION

In accordance with the present invention, a sliding device for sliding on the ground has an upper deck for supporting a rider thereon, and a slide base assembly mounted on side rails extending in parallel beneath it. The slide base assembly has an elongated planar member with curved ends and an endless anti-friction belt, track, or sheet entrained to slide around its top surface, curved ends, and bottom surface. The curved ends, planar member surfaces, and belt/track/sheet inner contact surfaces are designed to optimize anti-friction properties so that it easily slides around the planar member and enables the sliding device to slide down a hill on grass, dirt or synthetic turf. In a preferred embodiment, the deck is shaped as a body board of a thickness similar to those used by bodyboarders to surf waves, and the slide assembly in mounted in a cutout or cavity in its bottom. The interaction of the endless belt, track, or sheet around both curved ends of the planar member serves a unique "speed limiting" function that slows the sliding device from achieving excessive downhill speeds that may present a safety risk. The described principles of the invention may similarly be used for "summer sleds", "grass skis", "ground skateboards", etc.

Other objects, features, and advantages of the present invention will be explained in the following detailed description of the invention having reference to the appended drawings.

DETAILED DESCRIPTION OF INVENTION

In the following detailed description, certain preferred embodiments are described with specific details set forth in order to provide a thorough understanding for practice of the present invention. However, it will be recognized by one skilled in the art that the present invention may be practiced with modifications or with equivalents thereof given the principles disclosed herein. In other instances, well known methods, procedures, components, functions have not been described in detail as not to unnecessarily obscure aspects of the present invention.

As a general principle, the present invention seeks to provide a sliding device for recreational purposes, which involve sliding on the ground down a sloped or inclined surface (grass, dirt, sand, synthetic turf, etc.). The sliding device allows the rider to travel down a hill by reducing friction between the hill surface and the device. The friction-reducing mechanism has a slide base over which is entrained a wide, anti-friction belt. The belt can be made of rubber, high-density plastic or other durable material formed in a circular band, providing an endless anti-friction sliding surface between the slide base and the ground. The slide mechanism may recessed in a cavity formed in the bottom surface of the deck or board to reduce the overall height of the device and separate the rider's hands or feet from contacting the moving belt.

Figure 1:
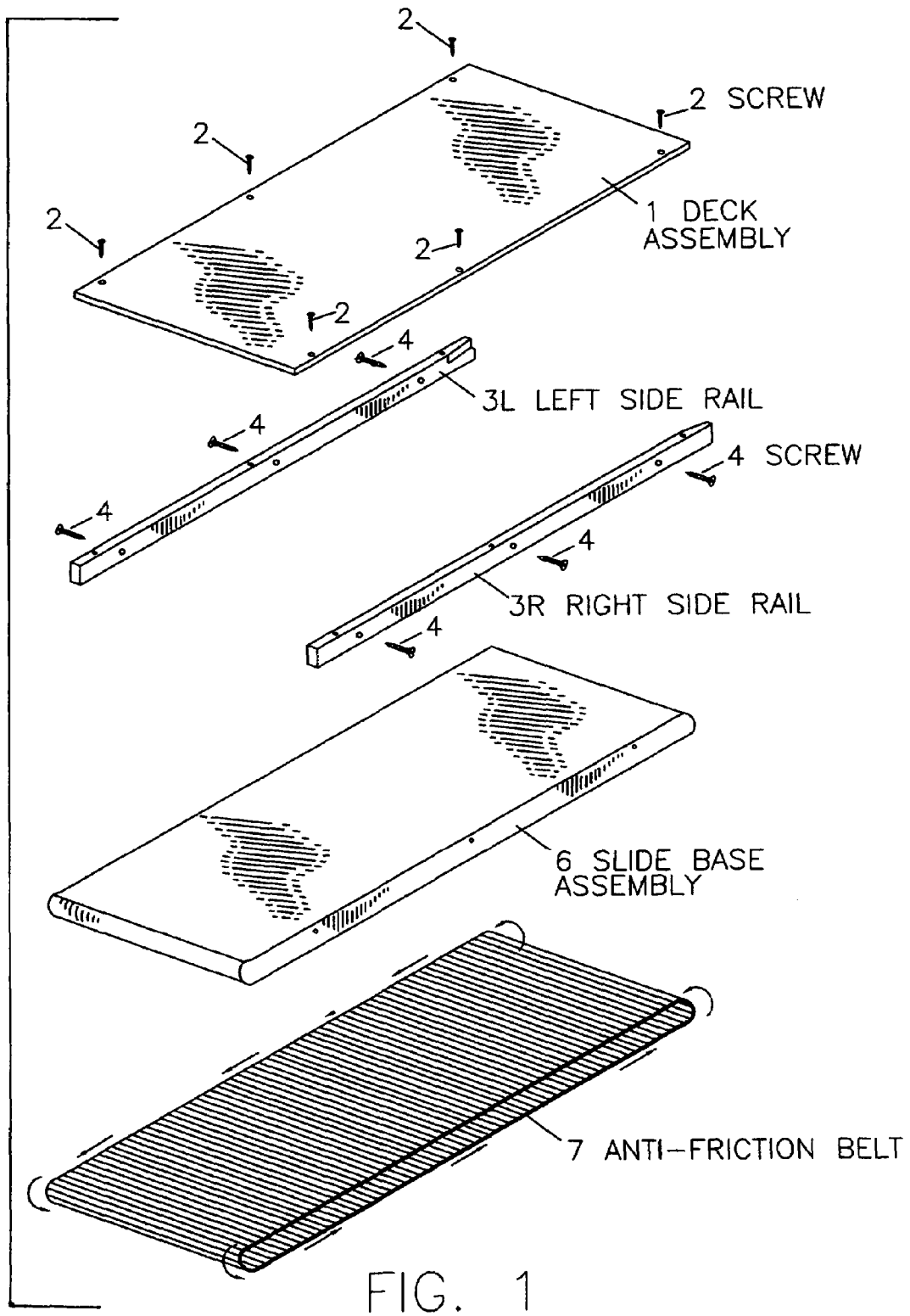
FIG. 1 shows an exploded view of a first embodiment of the sliding device in accordance with the invention.

Referring to FIG. 1, a first embodiment of the sliding device of the present invention has an upper deck 1 mounted with fastener elements (screws) 2 onto the top surfaces of a pair of side rails 3L and 3R. The side rails 3L and 3R have a certain height sufficient to mount with fastener elements (screws) 4 to the side surfaces of an elongated and planar slide base 6. An endless anti-friction belt (or track, band or sheet) 7 is entrained around the slide base 6 to slide by its inner surface thereon when subjected to pulling forces by contact of its outer surface with the ground. The thickness of the slide base 6 and its position of mounting to the side rails 3L and 3R are designed so as to leave a small gap between the upper surface of the slide base 6 and the lower surface of the deck 1 for sliding movement of the endless belt 7 therethrough along its upper run, and to project by a small height beyond the bottom surfaces of the side rails for sliding movement of the endless belt 7 as the lowest contact surface along its lower run in contact with the ground.

Figure 2:
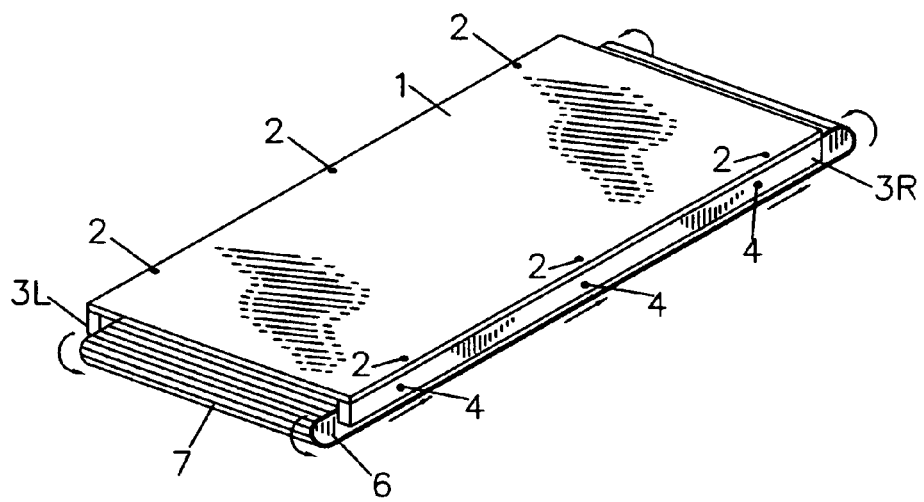
FIG. 2 shows an assembled perspective view of the embodiment of the sliding device shown in FIG. 1.
Figure 3:
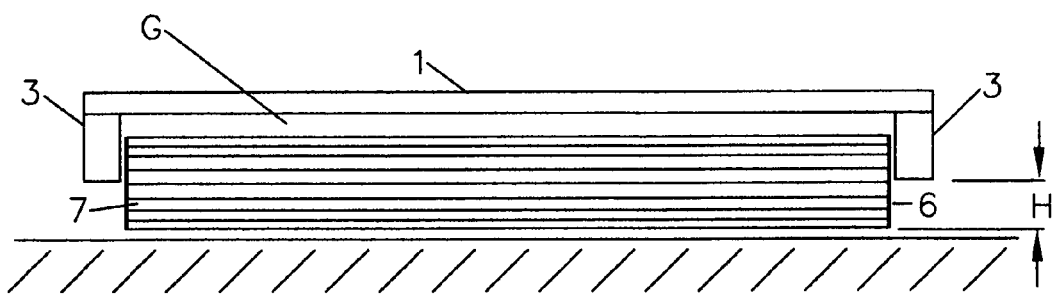
FIG. 3 shows an assembled front view of the embodiment of the sliding device shown in FIG. 1.

In FIG. 2, the slide mechanism is shown in assembled view with the belt 7 sliding between the base 6 and the deck 1 along its upper run and in sliding contact with the ground along its lower run. The interior surfaces of the side rails may be coated with a polyester laminating coating to reduce friction if the rails come into contact with the moving belt. FIG. 3 shows a front view of the slide mechanism, illustrating the small gap G between the base 6 and the deck 1 when mounted to the side rails 3 and the small height H of the belt 7 in sliding contact with the ground along its lower run. Preferably, the assembled slide mechanism provides a ⅝" gap for the height H between the bottom of the belt and the side rails. This prevents the side rails from rubbing on the surface of the slope. A lubricant such as furniture wax or silicone may be applied to the surface of the slide base to increase the sliding speed of the belt (and the board).

In its simplest form, an embodiment of the sliding can be made using a simple board for the upper deck 1 and a thicker board for the base 6, and the endless belt 7 can be made of a heavy gauge plastic sheet cut as a strip and having its ends joined or fused together. For example, the belt may be made of polycarbonate plastic, rated at temperatures in the range of 240° F. or more, with a thickness in the range of 0.020 inch or more. This material is found to have good slide characteristics, bend ability, and stiffness. Slide characteristics are based on the friction of the belt as it travels under the slide base. Bend ability is the force required to bend the belt as it passes around the front/rear radius. Some degree of stiffness is required for continuous tracking of the belt inside the rails. A material that is too soft may bunch up and fold against the side rails when the weight is shifted to the side. Bend ability and stiffness are affected when a thicker material is used. To increase stiffness and not lose bend ability, a thicker material with slots formed widthwise cutting into its thickness for flexibility.

Other suitable materials can be used for the components described. For example, the slide base may be made of a dense foam substrate covered by an outer film or layer of high-density plastic such as Teflon™ or Delrin™ plastic material available from Dow Chemical Corp. The endless belt 7 may be a rubber sheet having an anti-friction film applied to its inner surface, and striated segments on its outer surface to increase flexibility in sliding around the slide base and to reduce suction or adhesion with the ground surface.

Figure 4:
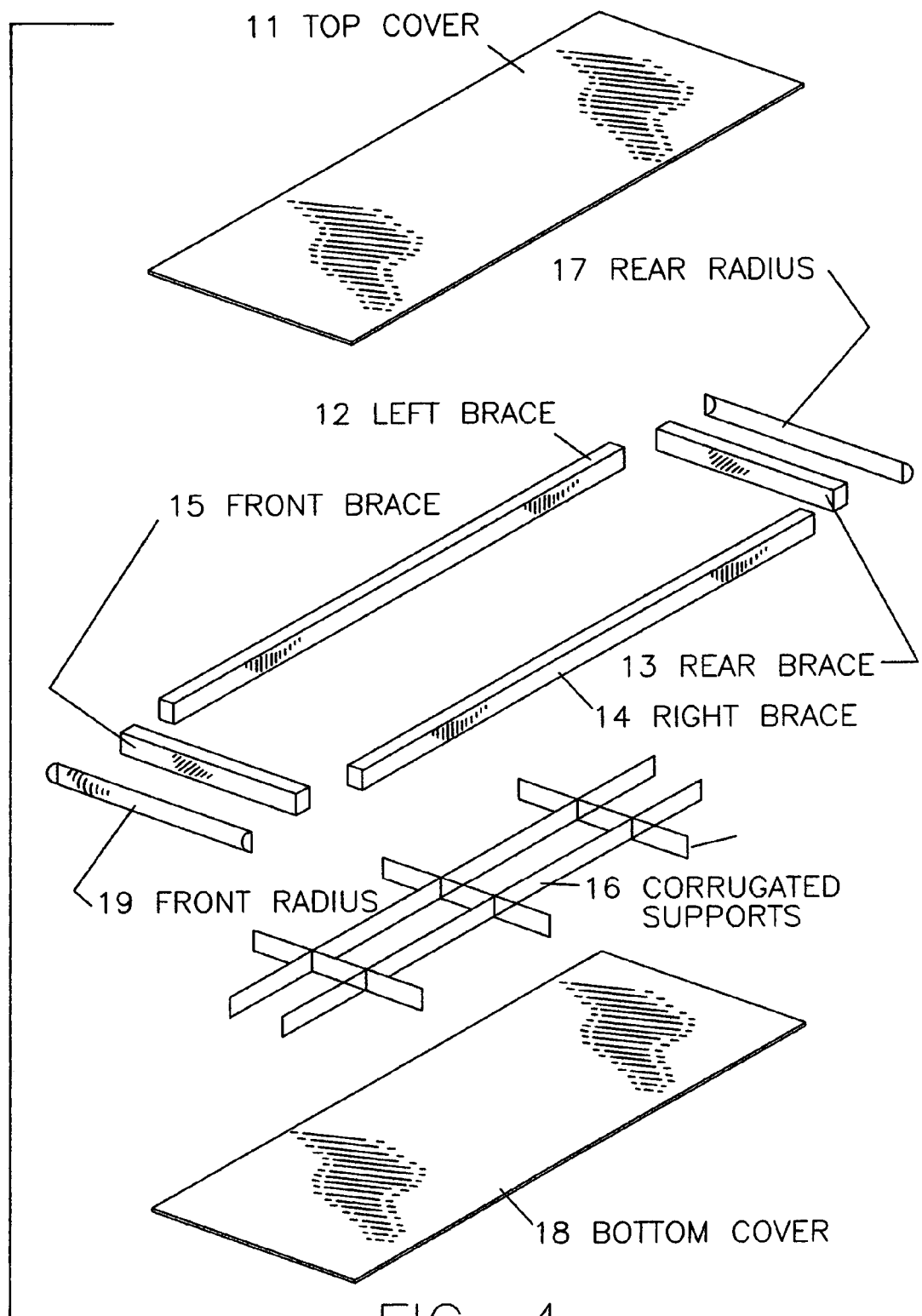
FIG. 4 shows an exploded view of a version of a slide base assembly for the sliding device.

In FIG. 4, a version of a slide base assembly for the sliding device is illustrated as being made of commonly available wood materials. For example, it can be made of top cover 11 and bottom cover 18 made of ⅛" mahogany sheet, a left brace 12, a rear brace 13, a right brace 14, and a front brace 15 made of wood lumber around the lateral edges of the slide base. Corrugated supports 16 may be provided in the interior space of the slide base between the edge braces, such as cardboard, foam, or honeycomb material. The top/bottom covers, braces and supports may be glued together. A front radius 19 and rear radius is glued and also screwed to the front and rear braces to provide the curved end surfaces for entraining the endless belt 7. The rear radius of the slide base may be beveled with a slight inward "V" to reduce the tendency of the belt from binding when re-entering the back of the board. The bottom surface of the bottom cover 18 is sanded for high smoothness. The entire slide base is coated with a polyester laminating coating to provide a very slippery surface for the belt to slide on. The coating may be rated to tolerate frictional forces generating heat at temperatures to 240° F.

Figure 5:
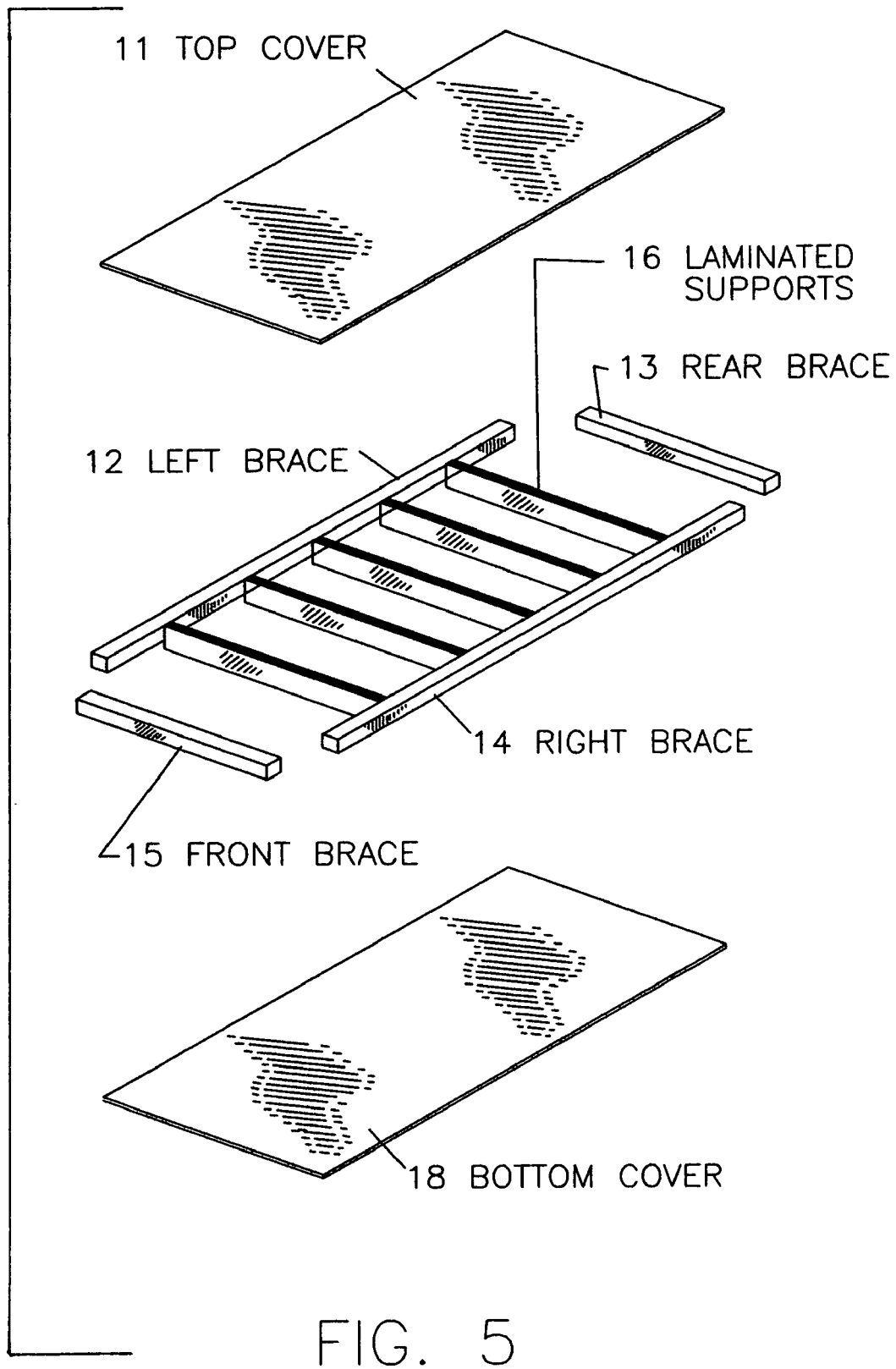
FIG. 5 shows an exploded view of a version of a deck assembly for the sliding device.

In FIG. 5, a version of a deck assembly for the sliding device is shown similarly made of commonly available wood materials. It may be formed of a top cover 11 and bottom cover 18 made of ⅛" mahogany sheet, a left brace 12, a rear brace 13, a right brace 14, a front brace 15, and laminated supports 16 provided in the interior space of the deck. The supports may instead be formed from cardboard, foam, or honeycomb material. The top/bottom covers, braces and supports are glued together.

Figure 6:
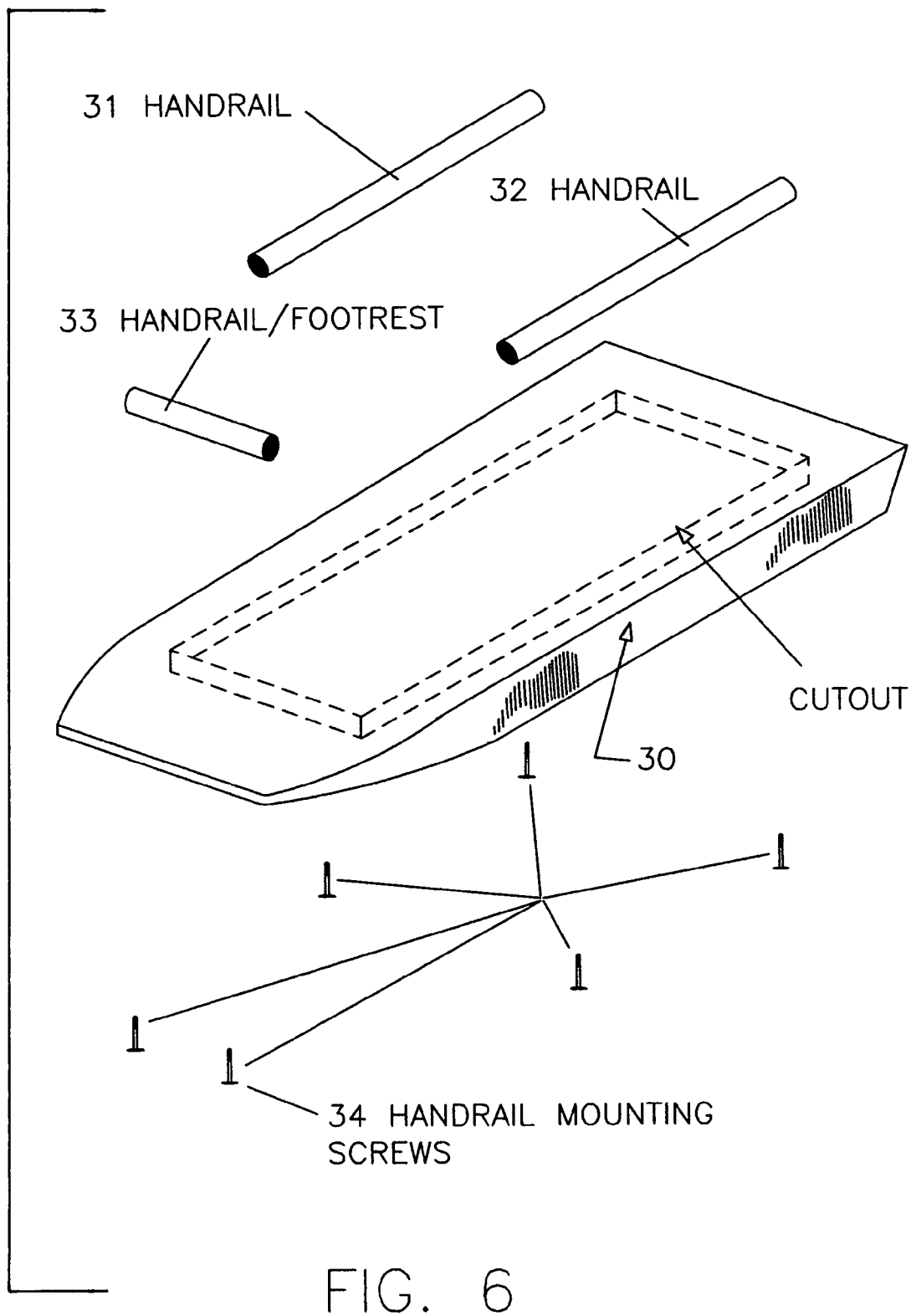
FIG. 6 shows an exploded view of a second embodiment of the sliding device shaped as a body board.

In FIG. 6, a preferred embodiment of the sliding device has a deck assembly made of a molded foam or plastic body 30 having the shape and thickness of body boards commonly used to surf waves. A rectangular cutout or cavity is formed in the bottom of the deck body 30 within which is mounted the slide mechanism by attachment of an upper surface thereof and/or its side rails to the interior walls of the deck body. Side handrails 31 and 32 and a forward handrail or footrest 33 may be attached by mounting screws 34 (from within the bottom cavity) to the upper surface of the deck body 30 to provide handles or rests for the rider to hold or grip onto. The deck material provides a certain amount of resilience for absorbing vibrations and jolts from sliding over the ground. It also has the advantage that it may bend or warp slightly if too much weight is placed on the board. The warping will allow the bottom surface of the deck to rub on the upper run of the belt over the slide base, thereby slowing the motion of the belt and the speed of the sliding. This may provide a useful safety feature reducing the speed in case a heavy person uses the board or more than one person attempt to use the board together.

The molded foam deck body provides the rider with a foam body for comfort and safety. The body may be fabricated of polyurethane into which the cutout is formed for insertion of the slide mechanism. The hand/foot rails may be constructed of a plastic core with foam covering.

The rails may be mounted 2" inset from the outer edges of the body to hold the appendages of the rider therein and help to prevent injury. With the slide mechanism recessed in the body cavity, a gap of about ⅝" is provided between the bottom surface of the body and the ground.

Figure 7:
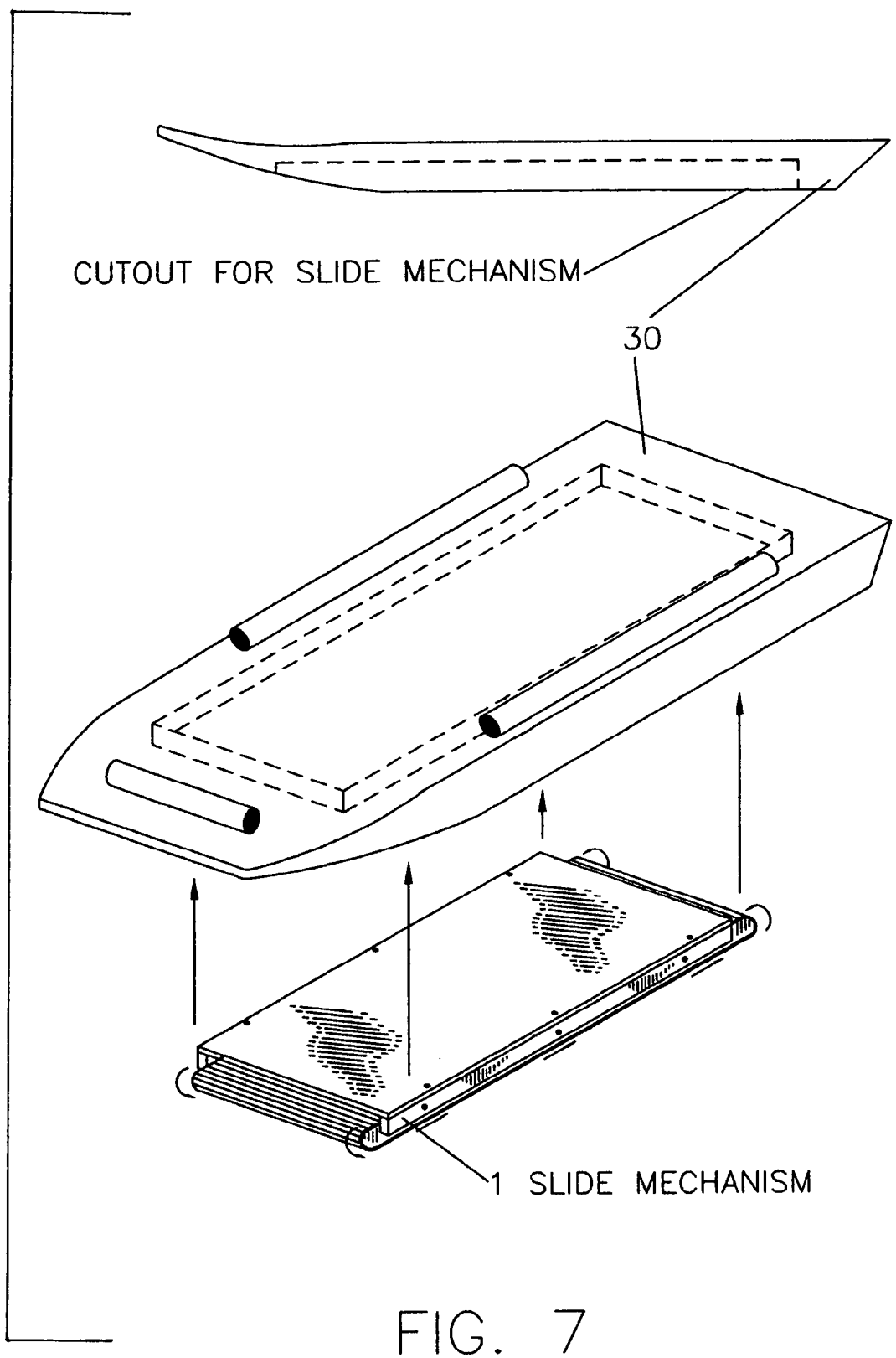
FIG. 7 shows an assembly view of the embodiment of FIG. 6 assembled with a slide mechanism in a recessed cutout in the bottom of the body board.
Figure 8:
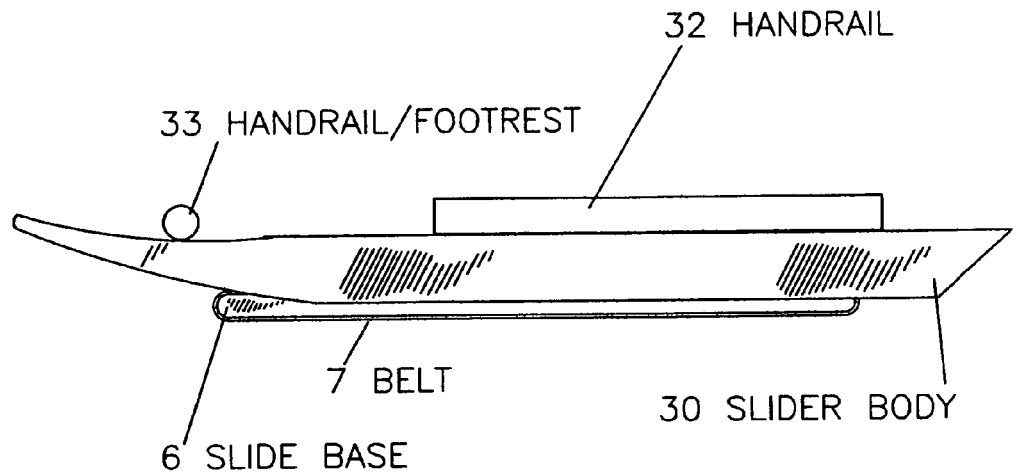
FIG. 8 shows a fully assembled view of the body board embodiment of the sliding device.

In FIG. 7, the molded deck 30 is shown being assembled to the slide mechanism 1 fitting within the cutout formed in the bottom of the deck. Recessing the slide mechanism 1 in the cutout cavity reduces the overall height of the device and separates the mechanism out of the way from the rider to prevent the rider's hands or feet from contacting the moving belt. FIG. 8 shows a fully assembled view of the body board embodiment of the sliding device.

Figure 9:
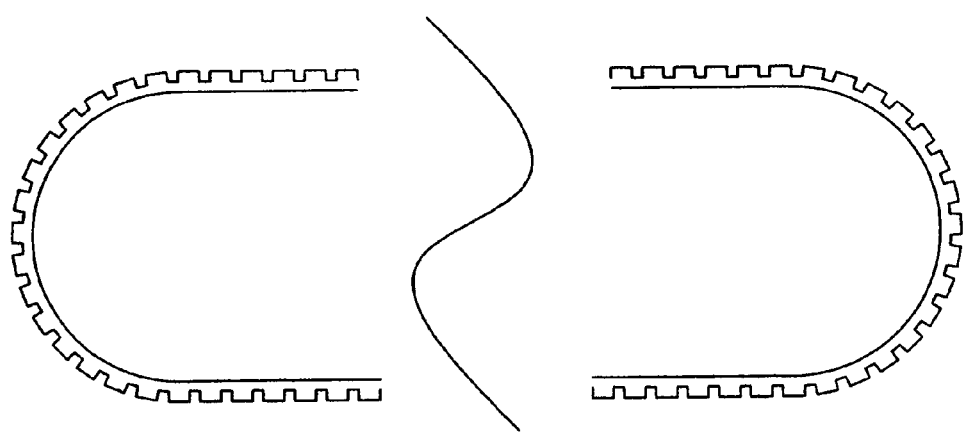
FIG. 9 illustrates using a track belt as the endless anti-friction belt.

FIG. 9 illustrates using a track belt as the endless anti-friction belt. A track belt has thicker tread segments alternating with thinner joint segments, as is well known to those familiar with these materials. The inner surface of the track belt is coated with a polyester laminating coating to provide a very slippery surface. The track belt is more costly but can provide better vibration and shock absorption, positive gripping contact with the ground, and high flexibility in movement around the slide base.

Figure 10:
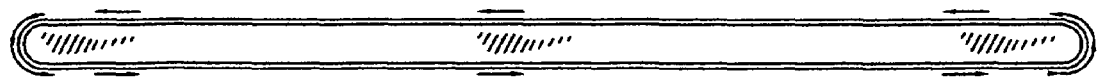
FIG. 10 shows the endless anti-friction belt entrained around the slide base member.
Figure 11A:
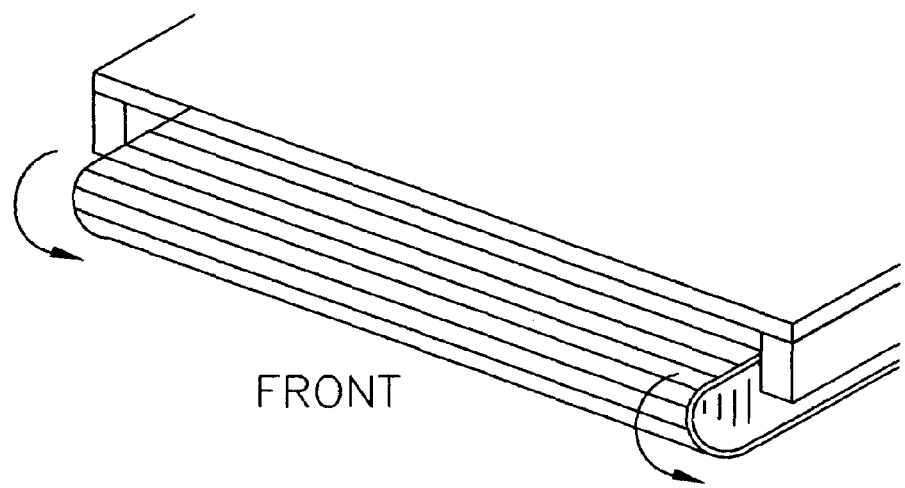
FIGS. 11A and 11B show closeup views of the endless anti-friction belt entrained around the front and rear ends of the slide base member.
Figure 11B:
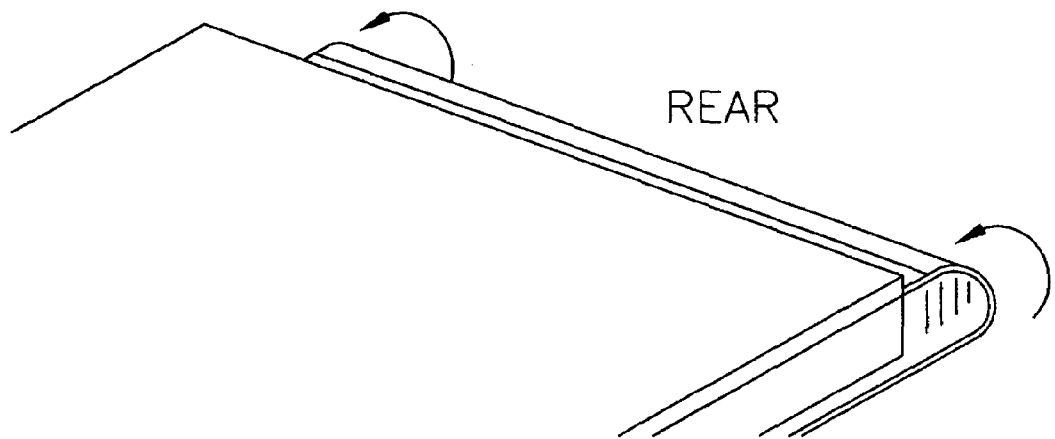

FIG. 10 shows the endless anti-friction belt entrained around the slide base member. The belt makes turns around the front and rear curved ends, as shown in FIGS. 11A and 11B, generating some amount of friction between the belt and the front and rear curved ends or radiuses. The front/rear radiuses preferably have curvature of about 5/8". It is found in testing that increasing the radius of curvature will increase the speed of the board. The interaction of the belt entrained around the radiuses is found to have a "speed-limiting" function by the amount of friction generated between the belt and the curved ends. The greater the radius, the less friction generated, and the higher the speed. A radius of about 5/8" corresponds to a board speed on a typical hill incline that can be safely used by children.

Figure 12:
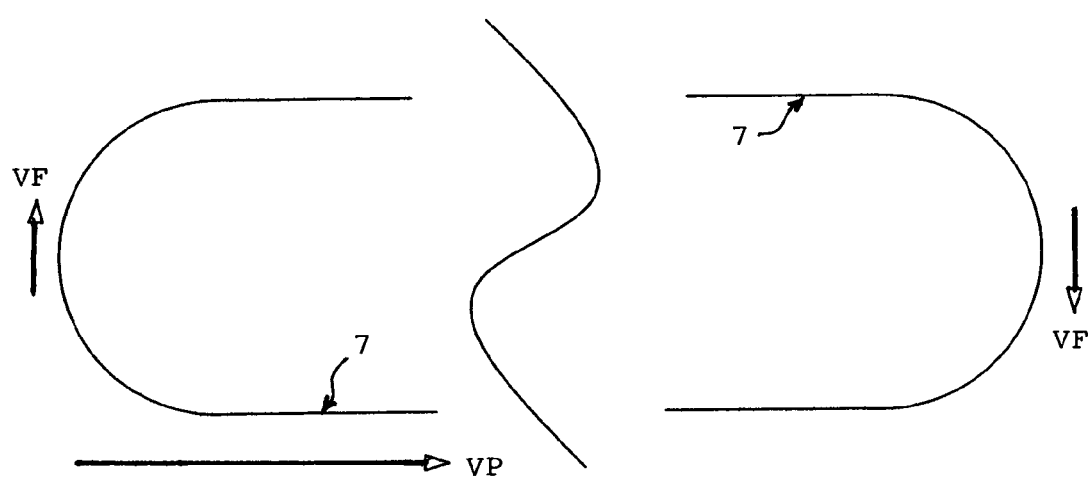
FIG. 12 illustrates how the interaction forces of the endless anti-friction belt entrained around the ends of the slide base member provide a "speed limiting" function.

FIG. 12 illustrates how the interaction forces of the endless anti-friction belt entrained around the ends of the slide base member provide a "speed limiting" function. The vector VP indicates the pulling force on the belt generated by contact of the belt with the ground as the sliding device slides downward under the influence of gravity. The vectors VF indicate the frictional forces generated by the turning movement of the belt around the end radiuses of the slide base which is opposite to the direction of movement of the belt. The frictional force vector increases non-linearly with the speed of movement of the belt, thereby generating greater relative opposition forces as the speed of the belt increases. This results in a "speed-limiting" function that presents an upper limit or terminal velocity that can be achieved for the typical conditions, hill inclines, and weights of riders for which the sliding device is intended to be used.

It will of course occur to those skilled in this field to use other substitutes and equivalent components or materials besides those described above. For example, the belt may be supported on front and back rollers instead of entrained around the curved radiuses of the slide base. If the front radius is replaced with one or more rollers, the friction at the front radius is almost completely eliminated, as the belt can now roll around a roller rather than rubbing on the front radius. Similarly, replacing the rear radius with a roller reduces rear friction loss to a minimum. However, this change would eliminate or reduce the "speed-limiting" function as a safety feature. Installing rollers along the entire bottom surface of the slide base was not found to improve the performance of the sliding device dramatically.

The described principles of the invention may similarly be used for other types of ground sliding devices, such as "summer sleds", "grass skis", "ground skateboards", etc. A comparable unit like the slide mechanism described herein can be fitted for other shapes and configurations of such ground sliding devices. A new product or products can be sold under a trademark such as "LAND SLIDER"™ for the sliding device in order to gain recognition with purchasers It is understood that many modifications and variations may be devised given the above description of the principles of the invention. It is intended that all such modifications and variations be considered as within the spirit and scope of this invention, as defined in the following claims.

The invention claimed is:

1. A sliding device for sliding on the ground down a hill or inclined surface, comprising:
    an upper deck having opposite lateral sides and a flat surface of a predetermined width extending between said lateral sides sufficient for supporting a rider thereon, and
    a slide mechanism mounted spacedly below and in parallel with the upper deck, having a slide base formed by an elongated planar member having opposite lateral sides and top and bottom flat surfaces of a width substantially matching the width of the upper deck and provided with opposite radiused ends, and a single, endless anti-friction belt entrained in a lengthwise direction around the slide base and extending across the width between the lateral sides thereof and adapted to slide around the top surface, radiused ends, and bottom surface due to the force of sliding friction contact with the ground,
    wherein the planar member surfaces and radiused ends and endless belt are selected so as to have anti-friction properties to permit the endless belt to slide around the slide base and enable the sliding device to slide down the hill or inclined surface.

2. A sliding device according to claim 1, wherein said upper deck is mounted on top surfaces of a pair of spaced-apart side rails, and the slide base is mounted to the side rails in the space between them, and wherein said slide base has a thickness and is mounted to the side rails at a position so as to have its bottom surface extending beyond the bottom surface of the side rails by a given height to space the side rails from contact with the ground.

3. A sliding device according to claim 2, wherein said slide base is mounted to the side rails so that its top surface is spaced by a given gap from the bottom surface of the deck to allow movement of the endless belt therebetween.

4. A sliding device according to claim 1, wherein said slide base is formed a top cover sheet, a bottom cover, a left side brace, a rear brace, a right side brace, and a front brace around the lateral edges of the slide base between the top and bottom cover sheets, and a front radius is mounted to an outwardly-facing surface front brace, and a rear radius is mounted to an outwardly-facing surface of the rear brace.

5. A sliding device according to claim 4, wherein said slide base has supports provided between the cover sheets and the braces.

6. A sliding device according to claim 5, wherein the supports are made of a material selected from the group consisting of laminate, cardboard, foam, and honeycomb material.

7. A sliding device according to claim 1, wherein said belt is made of a polycarbonate plastic sheet, rated at a temperature in the range of 240° F. or more, with a thickness in the range of 0.020 inch or more.

8. A sliding device according to claim 1, wherein said belt is made of a rubber sheet having an anti-friction film applied to its inner surface.

9. A sliding device according to claim 1, wherein said rubber belt has striated segments formed in its outer surface to increase flexibility in sliding around the slide base and to reduce suction or adhesion with the ground surface.

10. A sliding device according to claim 1, wherein said belt is formed as a traction belt having thick segments alternating with joint segments of lesser thickness to increase flexibility in sliding around the slide base and to reduce suction or adhesion with the ground surface.

11. A sliding device according to claim 1, wherein said deck is made of a foam substrate covered by an outer layer of high-density plastic.

12. A sliding device according to claim 1, wherein said deck is made of molded foam formed in a shape of a body board.

13. A sliding device according to claim 1, wherein said deck is made of a body substrate of a given thickness and has a cutout formed into its bottom surface for accommodating the slide mechanism therein.

14. A sliding device according to claim 13, wherein the cutout in said deck is formed so that the slide mechanism is recessed in the body cutout to provide a gap of about 5/8" between the bottom surface of the body and the ground.

15. A sliding device according to claim 13, wherein the cutout in said deck is formed so that the slide mechanism is recessed in the body cavity to prevent the rider's hands or feet from contacting the moving belt.

16. A sliding device according to claim 1, wherein said slide base is coated with a polyester laminating coating to provide a slippery surface for the belt to slide on.

17. A sliding device according to claim 1, wherein said deck is provided on its top surface with handrails to provide handles or rests for the rider to hold or grip onto.

18. A sliding device according to claim 1, wherein said slide base is formed with radiused ends of selected radiuses to generate friction forces with the moving belt that provide a "speed limiting" function that slows the sliding device from excessive speeds.

19. A sliding device according to claim 18, wherein said slide base ends have a radius of curvature of about 5/8 inch.

20. A sliding device according to claim 1, wherein said device is configured in a product for sliding use as one of a group consisting of a body board, a sled, a ski, and a skateboard.

* * * * *